Feb. 26, 1924.

C. KLEINTOP

DIPPER

Filed June 20, 1923    2 Sheets-Sheet 1

1,485,273

Charles Kleintop
INVENTOR
BY Victor J. Evans
ATTORNEY

WITNESSES:

Feb. 26, 1924.  
C. KLEINTOP  
DIPPER  
Filed June 20, 1923  
1,485,273  
2 Sheets-Sheet 2

Charles Kleintop
INVENTOR

BY *Victor J. Evans*
ATTORNEY

WITNESSES:
*R. E. Wise*
*H. Cullison*

Patented Feb. 26, 1924.

1,485,273

UNITED STATES PATENT OFFICE.

CHARLES KLEINTOP, OF ALLENTOWN, PENNSYLVANIA.

DIPPER.

Application filed June 20, 1923. Serial No. 646,596.

*To all whom it may concern:*

Be it known that I, CHARLES KLEINTOP, a citizen of the United States, residing at Allentown, in the county of Lehigh and State of Pennsylvania, have invented new and useful Improvements in Dippers, of which the following is a specification.

This invention relates to dippers, and has particular application to a device primarily intended for vending ice cream, wherein use is made of a cone to receive the cream.

In the present day practice of vending ice cream in cones, the ice cream is not received within the cone to any appreciable extent, which is due to the shape of the dipper used in this connection, or the size of the cone with relation to the size and shape or the quantity of cream so dispensed, consequently the ice cream drops down the side of the cone soiling the hands of the user, and frequently soiling the clothing.

It is therefore the chief characteristic of this invention to provide a dipper for the purpose above mentioned having a configuration similar to the configuration of the cone shaped receptacle to receive the ice cream, and more or less consistent in size to the size of the cone, so that the ice cream can be well positioned within the cone to overcome the above noted objections.

In carrying out the invention, I not only devise a dipper of conical formation, but make use of a dipper having a pivoted section which when released from the relatively fixed section permits the ice cream to be conveniently positioned within the cone directly from the dipper.

Another object of the invention resides in the novel construction of means for not only holding the pivoted section normally fixed with relation to the stationary section of the dipper but also effecting a release of the pivoted section incident to the positioning of the cream within the cone, which pivoted section is automatically moved away from the stationary section subsequent to its release for this purpose.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
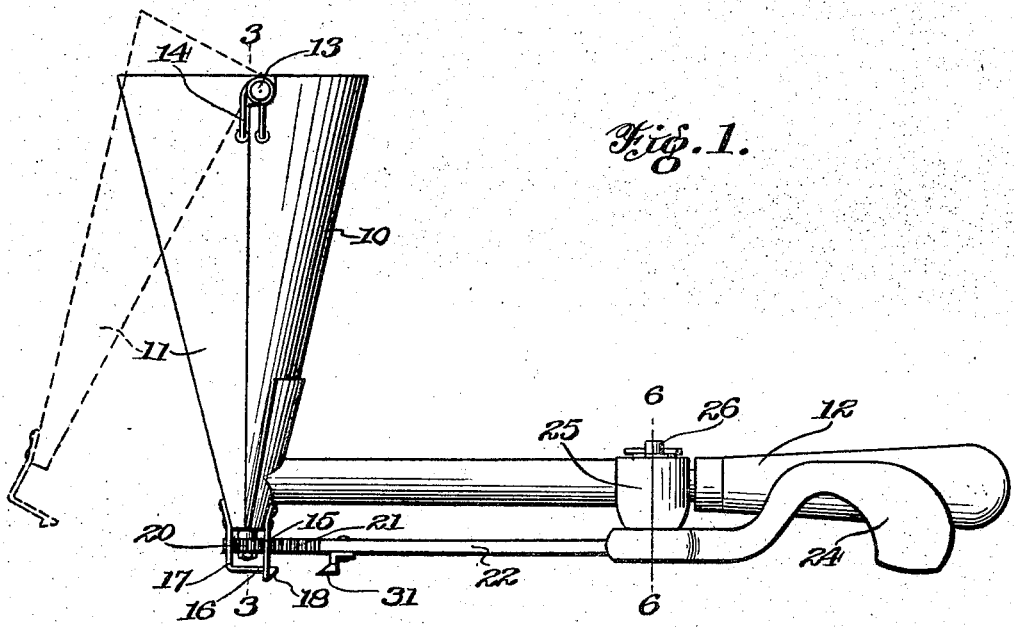
Figure 1 is a side elevation of the dipper constructed in accordance with the present invention showing the pivoted section in normal position by full lines and in its adjusted position by dotted lines.
Figures 2, 3:
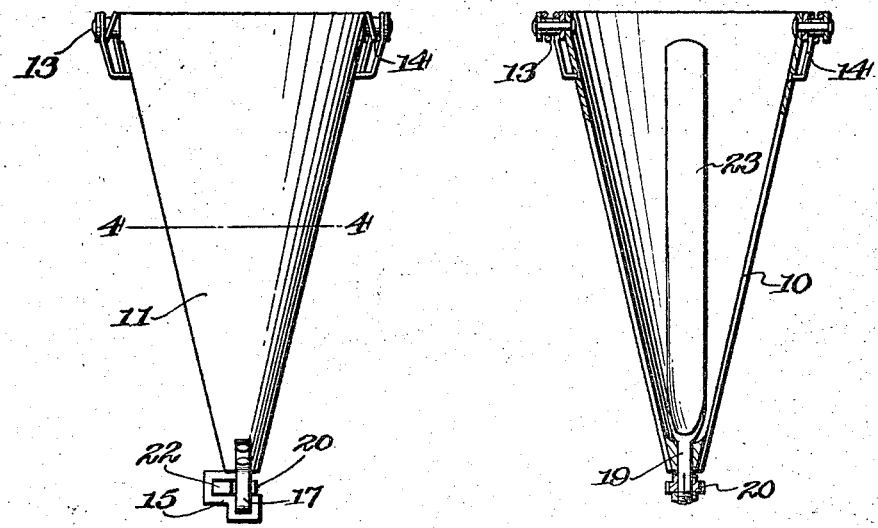
Figure 2 is a view taken at a right angle to Figure 1.
Figure 3 is a sectional view taken on the line 3—3 of Figure 1.
Figure 4:
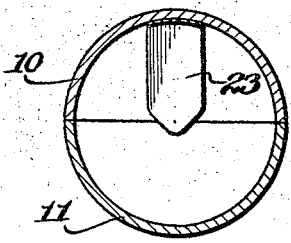
Figure 4 is a sectional view taken on the line 4—4 of Figure 2.
Figure 6:
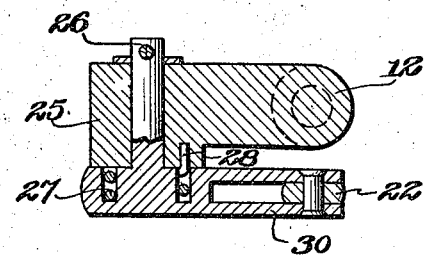
Figure 6 is a fragmentary view of the handle.
Figure 5:
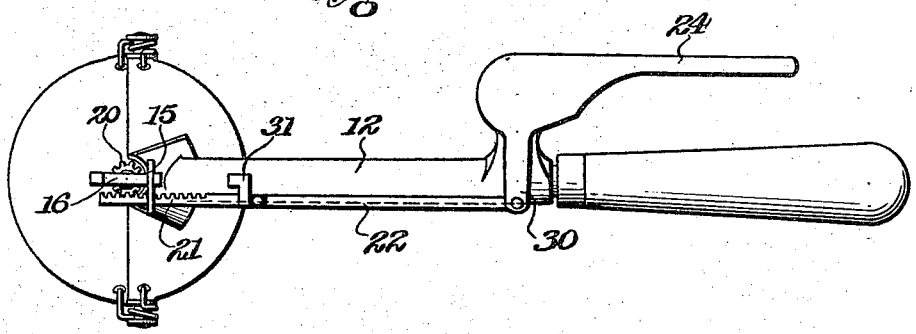
Figure 5 is an enlarged fragmentary view of the lower portion of the dipper and the sliding rack bar showing the manner in which these parts are associated.
Figure 7:
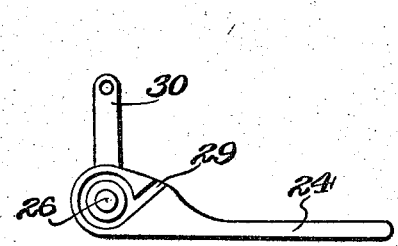
Figure 7 is a detail view of the lever.
Figure 8:
Figure 8 is a view taken at a right angle to Figure 7.

Referring to the drawings in detail, 10 and 11 indicate respectively the sections of the dipper which as shown are of conical configuration, the section 10 will be hereinafter referred to as a stationary section, being secured to the adjacent end of the handle 12, which of course is arranged at a right angle to the dipper. The section 11 is pivoted to the section 10 at the large end thereof, the pivotal connection being indicated at 13. Associated with the pivot is a spring 14 normally under tension, so that when the movable section 11 is released from the stationary section 10, in a manner to be hereinafter described, the section 11 is automatically moved away from the section 10 under the influence of the spring 14. Depending from the handle 12 is a fixed part 15 of a bracket which is designed to receive the latch 16 for holding the movable section 11 in its normal position. This latch 16 is carried by the other part 17 of the bracket, which part is normally arranged parallel to the portion 15 thereof. However the part 17 of this bracket is secured to the movable section 11 of the dipper and supports the latch 16 at a right angle thereto. The latch 16 is provided with a bevelled surface 18 for a purpose to be presently described.

Journalled in the lower portion of the handle is a stem 19 which carries a small pinion 20, the latter meshing with the teeth 21 of a rack bar 22 arranged in parallelism with the handle 12 and mounted for reciprocal movement. A stem 19 also supports a movable blade or cutter 23 which is in close contact with the inner surface of the stationary section 10 of the dipper, so that when the stem is rotated in one direction subsequent to the filling of the dipper with ice cream, the cutter blade is moved about the section 10 to separate the cream therefrom, thus allowing the cream to be easily and conveniently deposited in the cone above referred to.

The rack bar 22 is actuated by a lever 24, the lever being arranged immediately adjacent the handle to be simultaneously gripped with the latter. The handle is formed with an offset cylindrical portion 25 beneath which one end of the lever 24 is arranged, and projecting from this end of the lever is a pivoted pin 26 which passes through the cylindrical portion 25, the lever being mounted for pivotal movement. Surrounding the pin 26 and arranged within the cylindrical portion 25 is a coiled spring 27, one end of which is secured as at 28 to the portion 25 of the handle, while the other end is received by the slot 29 provided in the lever. This spring functions to automatically return the lever 24 to normal position after each operation. Projecting laterally from the lever 24 is an extension 30 to which the adjacent end of the rack bar 22 is pivotally connected, so that this rack bar is reciprocated incident to the pivotal movement of the lever 24. Supported by this rack bar 22 at an appropriate point in its length is a wedge shaped element 31 adapted to contact the bevelled surface 18 of the latch 16 when the element 31 is moved in the direction of the dipper. Incident to the contact between these parts, the latch 16 which is of a resilient nature is lifted off the portion 15 of the bracket above described, thus effecting a release of the movement section 11 of the dipper, whereupon it is automatically swung away from the stationary section 10. In practice the section 11 is normally arranged in the manner shown by full lines in Figure 1, and the dipper used in the usual well known manner for vending ice cream in cones. After the dipper has been filled with cream, the lever 24 is pressed against, thereby moving the rack bar 22 in the direction of the pinion 20, rotating the latter, together with the cutter blade 23. The latter operating to separate the ice cream from the stationary section 10 of the dipper, but on continued movement of the rack bar 22 in the direction just stated, the wedge shaped element 30 contacts the latch 15 effecting a release of the movable section 11, whereupon the latter is automatically moved away from the section 10 under the influence of the spring 14. The dipper can thus be arranged in proper relation to the cone shaped receptacle adapted to receive the ice cream, the latter being permitted to slide off the stationary section 10 into the cone shaped receptacle, in a manner that allows the ice cream to be received an appreciable distance within the cone shaped receptacle. The section 11 can be moved to its normal position by pressing it against any object until the latch 16 engages the bracket member 15.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A dipper of the character described comprising a body portion having a stationary section, and a relatively movable pivoted section, a handle supporting the stationary section, means for holding the movable section normally fixed with relation to the stationary section, a cutter blade mounted for movement within the stationary section, means for effecting a release of the movable section, and means controlled by the last mentioned means for operating said cutter just prior to releasing the movable section for the purpose specified.

2. A dipper of the character described including a body portion having a stationary section and a movable section, the latter mentioned section being pivoted upon the stationary section at one end thereof, means for normally holding the movable section associated with the stationary section in the formation of a dipper, a handle supporting the stationary section, means effecting a release of the movable section, said means including a pivoted lever associated with the handle, and a reciprocatory bar operated by said lever, and means for automatically swinging the movable section away from the stationary section subsequent to its release.

3. A dipper of the character described including a body portion of conical formation, said body portion comprising a stationary section and a movable section pivoted upon the first mentioned section adjacent the large end thereof, a handle supporting the stationary section, means for normally holding the pivoted section associated with the stationary section, a cutter blade movable within the stationary section, a pinion associated with the cutter, a rack bar meshing with the pinion and arranged parallel with said handle, a lever pivoted on the handle and operating said bar in one direction, whereby said cutter is rotated for the purpose specified, means carried by the bar for effecting a release of the pivoted section, means for automatically swinging the pivoted section away from the stationary section subsequent to its release, and means for automatically returning the lever and its associated parts to normal position.

In testimony whereof I affix my signature.

CHARLES KLEINTOP.